April 18, 1961  J. J. HAGOPIAN ET AL  2,980,903
RADAR-COMMAND SYSTEM OF TIME CODED PULSES
Filed March 19, 1948  6 Sheets-Sheet 2

(CODER OUTPUT WAVEFORMS)

INVENTORS
Jacob J. Hagopian &
BY  Douglas G. Trego
ATTORNEY (CODER WAVEFORMS)

Fig. 4 (DECODER)

(DECODER WAVEFORMS)

INVENTORS
Jacob J. Hagopian &
Douglas G. Trego
ATTORNEY ("LEFT" & "RIGHT" SIGNAL CONTROL CIRCUITS)
(B+ RELAY SHOWN EXTERNAL ON BLOCK DIAGRAM OF DECODER)

("DOWN" SIGNAL CONTROL CIRCUIT)

2,980,903
Patented Apr. 18, 1961

2,980,903

RADAR-COMMAND SYSTEM OF TIME CODED PULSES

Jacob J. Hagopian, Hollywood, Calif., and Douglas G. Trego, Akron, Ohio, assignors to Goodyear Aircraft Corporation, Akron, Ohio, a corporation of Delaware Filed Mar. 19, 1948, Ser. No. 15,766

6 Claims. (Cl. 343—7.6)

This invention relates to systems for remotely controlling bodies, such as airplanes, and the like, and, more particularly, is concerned with remote control systems combined with radar.

It is the general object of the invention to provide apparatus which will serve to both follow a body or vehicle by radar, and issue command signals to the body or vehicle to control the movement thereof.

Another object of the invention is to provide apparatus of the indicated type which will also function to locate a target, landing field, harbor, or the like, for the body or vehicle.

Another object of the invention is the provision of apparatus for use in conjunction with a conventional radar and which will use the time interval between the last desired echo signal and the following search pulse to transmit intelligence signals to an airplane or other vehicle, first to interrogate the vehicle through apparatus carried by it, and if the vehicle responds to the interrogation to command the vehicle with control signals such as "left," "right," "down," or "auxiliary."

Another object of the invention is to provide coder apparatus in association with a radar transmitter, the coder being triggered by a radar pulse to modulate the radar wave to send interrogation pulses at selected micro-second time intervals to a decoder carried by the body or vehicle being controlled, and if the decoder opens control channels, the coder will transmit control signals through the decoder to operate one or more controls carried by the body or vehicle.

Another object of the invention is to provide apparatus of the described character which can be used to follow and control a plurality of bodies simultaneously.

The foregoing objects of the invention, and other objects which will become apparent as the description proceeds, are achieved by incorporating with a radar transmitter an apparatus for transmitting control pulses of different time separation by modulating the radar wave during the time interval between the last desired echo signal and the following search pulse. The aforesaid apparatus is used in conjunction with a decoder carried by the body or vehicle being controlled, the decoder having separate channels responding to the different pulse separations to control the body or vehicle. If several bodies or vehicles are being simultaneously followed and commanded by the radar, interrogation pulses of different time separation may be sent to the several airplanes, and the decoding apparatus associated with each airplane will only respond to the control information sent following the correct interrogation signal to each particular airplane.

For a beter understanding of the invention, reference should be had to the accompanying drawing, wherein.

Figure 1:
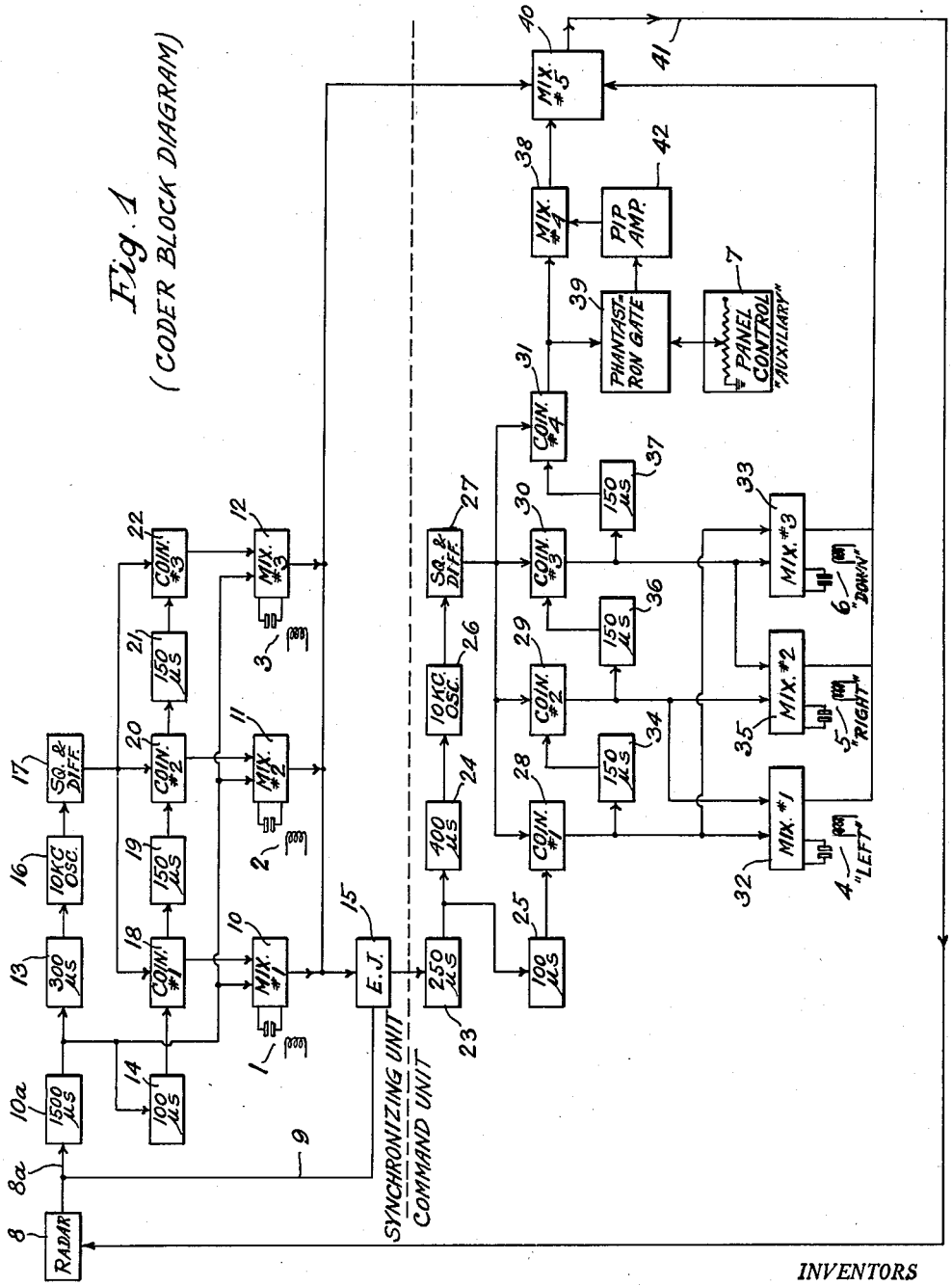
Fig. 1 is a block wiring diagram of apparatus incorporating the principles of the invention and comprising a coding apparatus used to control three separate airplanes with four different controls consisting of "right," "left," "down," and "auxiliary"
Figure 3:
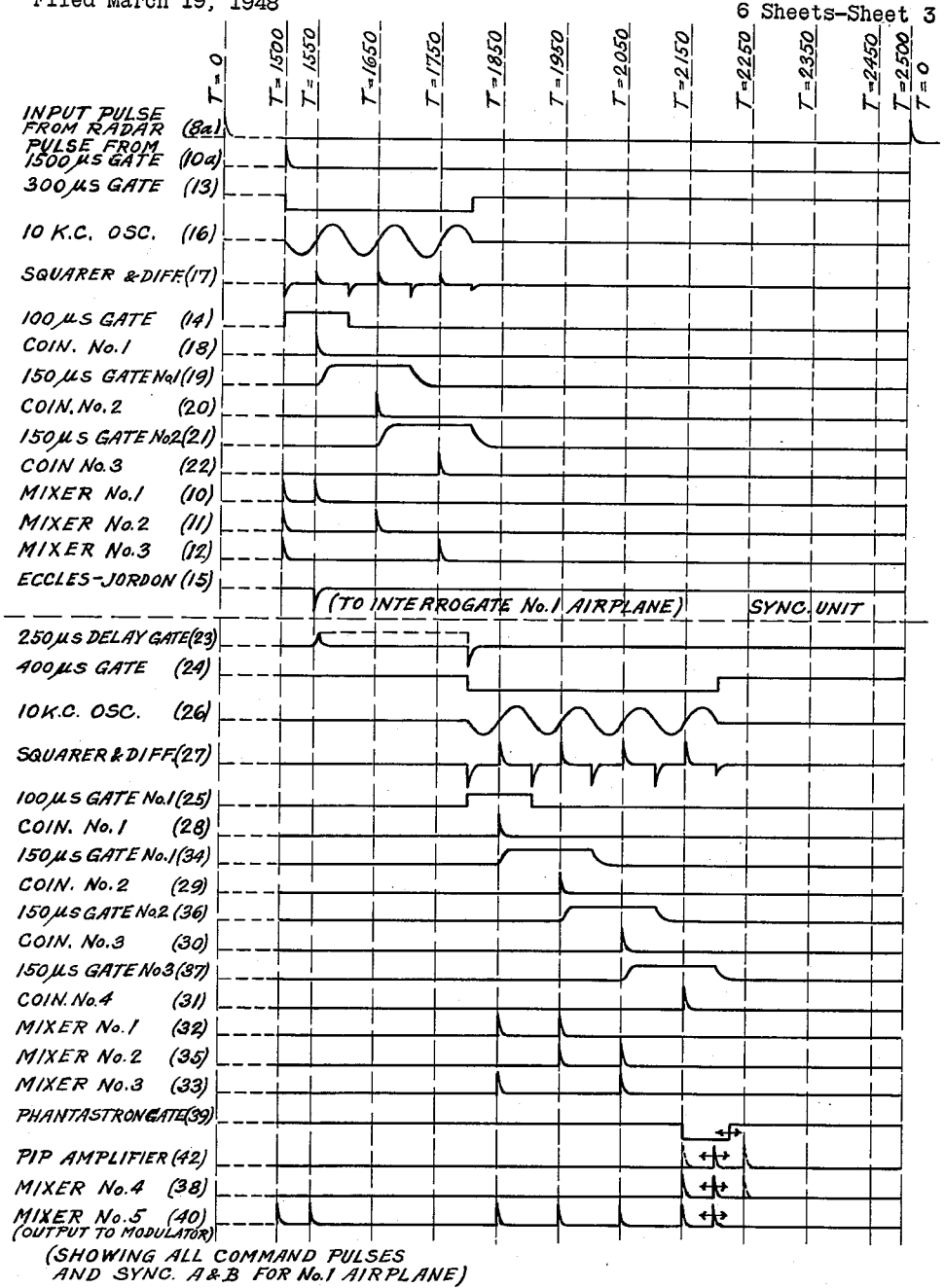
Figure 4:
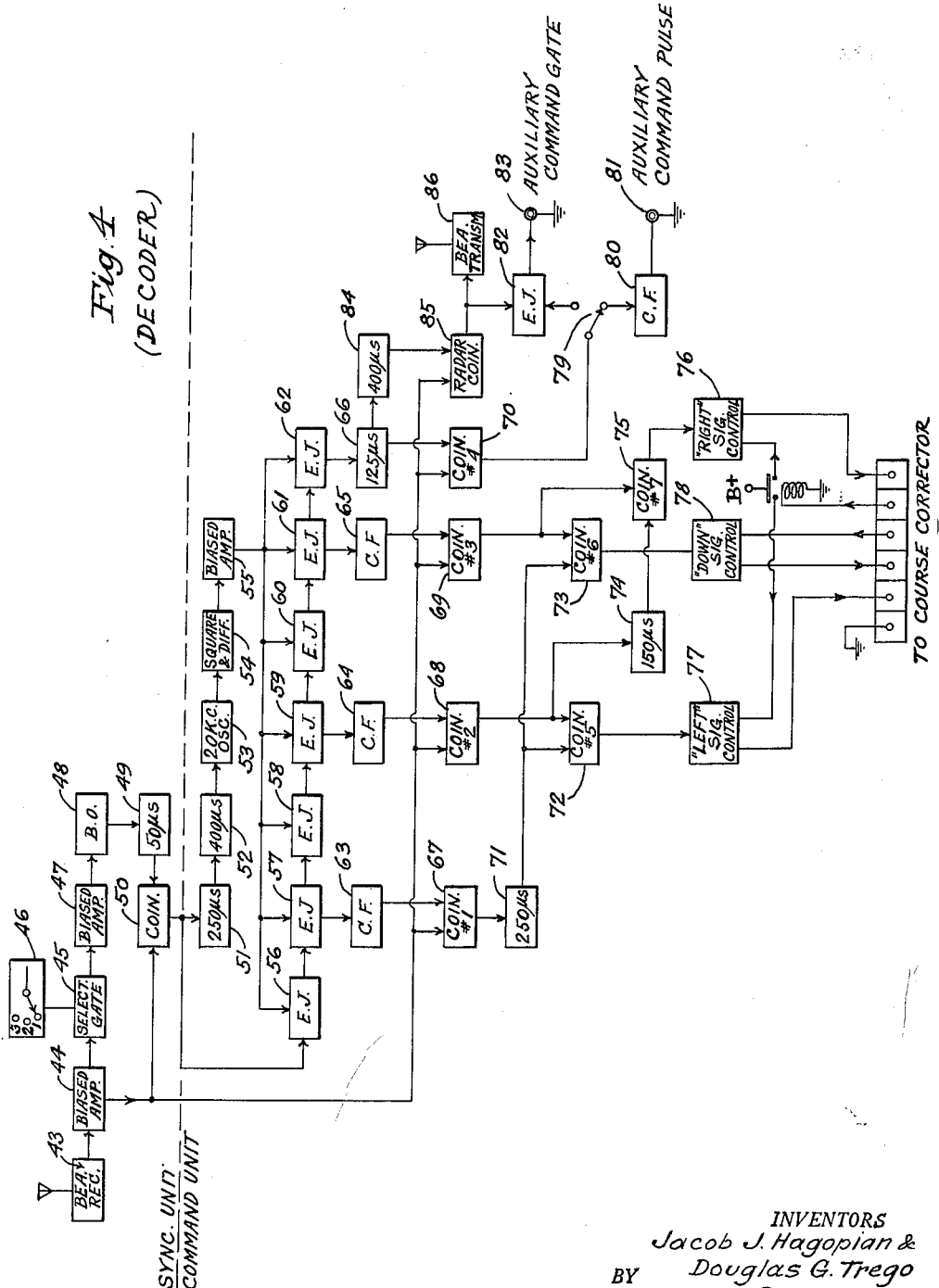
Figure 5:
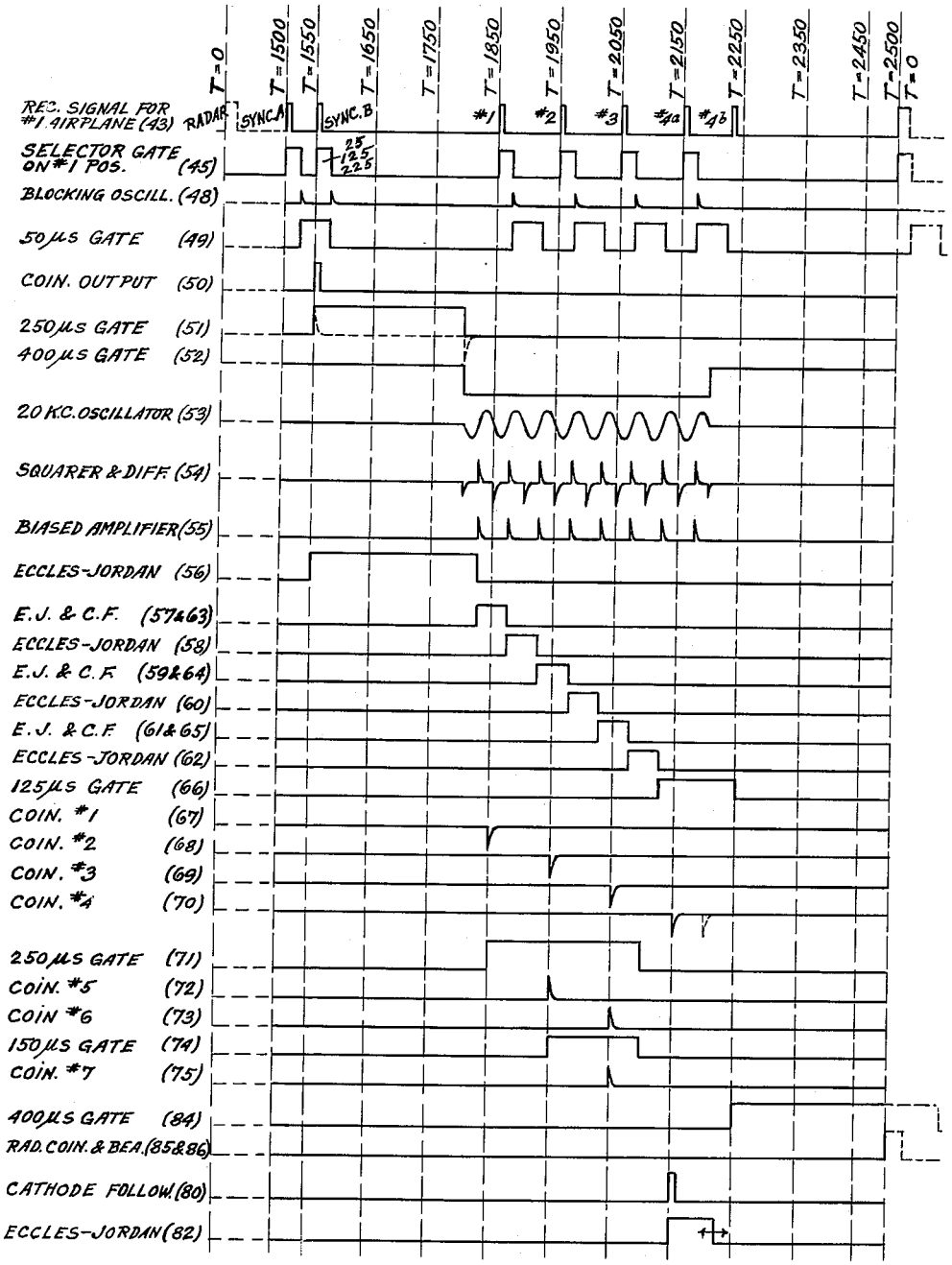
Figure 6:
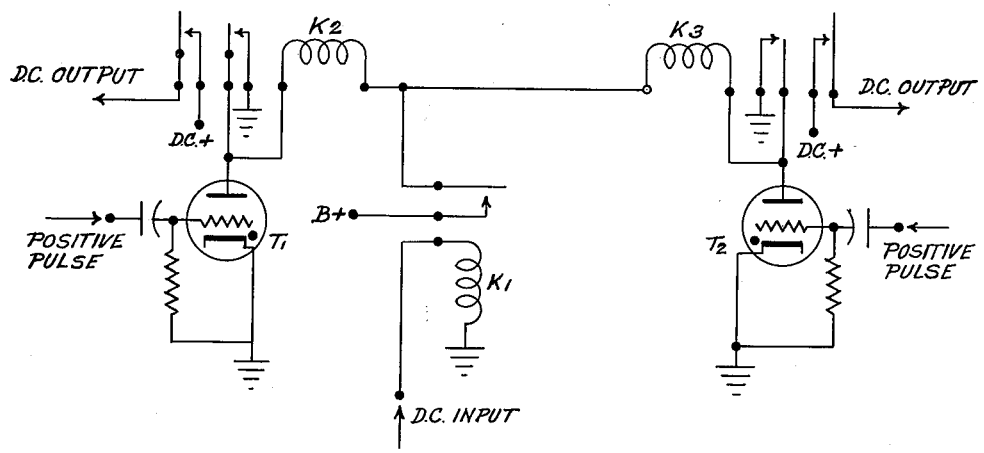
Figure 7:
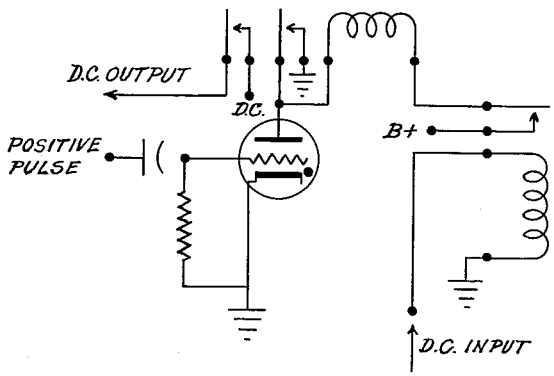

Fig. 3 diagrammatically illustrates pulse times and wave forms in the coder apparatus illustrated in Fig. 1;

Fig. 4 is a block wiring diagram illustration of the decoding apparatus associated with each body being guided;

Fig. 5 is a diagrammatic illustration of pulse times and wave forms in the decoder apparatus of Fig. 4;

Fig. 6 is a schematic wiring diagram of the "left" and "right" signal control circuits shown in block diagram form in Fig. 4;

Fig. 7 is a schematic wiring diagram of the "down" signal control circuit shown in block diagram form in Fig. 4.

GENERAL DESCRIPTION

It will be understood that the apparatus of the present invention is adapted to be used to control any of a wide variety of objects, the radar and coder may be carried in an airplane or other vehicle or on the ground, and the distances through which the apparatus functions may be as desired, subject to the limitations of the radar equipment. However, the apparatus is primarily designed to control one or more airplane or missiles from a mother airplane and up to distances of one hundred miles, and for purposes of simplification will be hereinafter so described.

As heretofore noted, the coder apparatus of Fig. 1 is adapted to be associated with a radar transmitter, and the decoder apparatus of Fig. 4 is adapted to be carried on the airplane which is being followed and controlled by the radar. The coder apparatus is used to modulate and control the transmission of micro-second pulses on the radar during the period between the last desired echo signal and the following search pulse. With the radar operating upon the basis of four hundred cycles per second, each radar cycle is twenty-five hundred micro-seconds long which is adequate for a one hundred mile search range, and yet will provide time in each cycle for command pulses.

Figure 2:
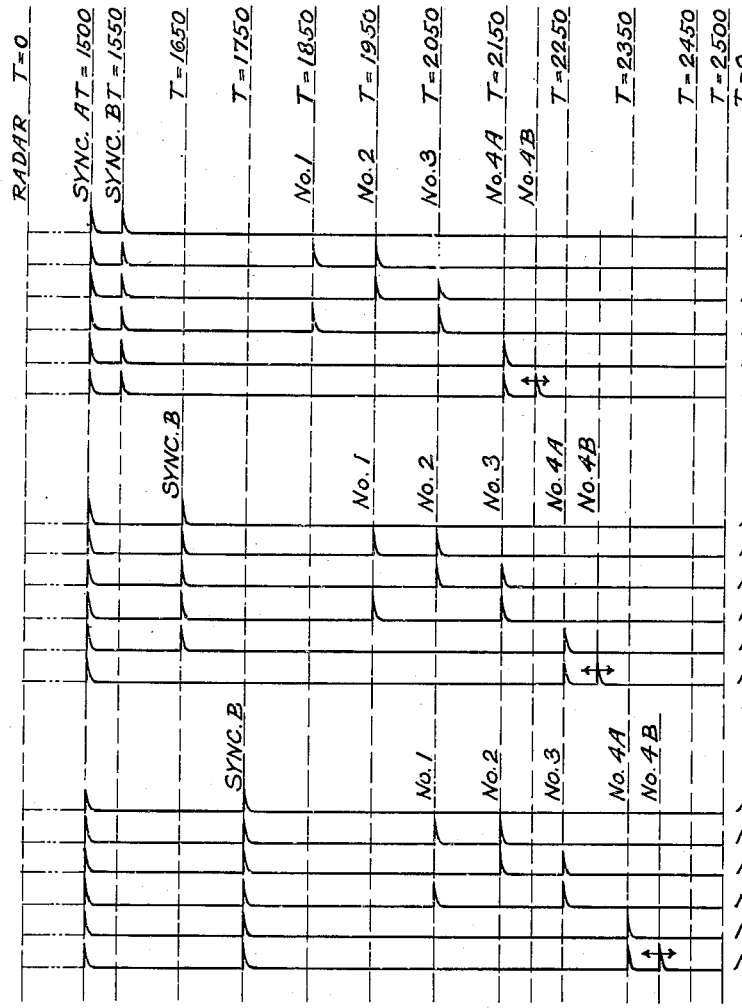
Fig. 2 is a diagrammatic showing of signal pulses used in the apparatus of Fig. 1 and utilizing a radar search pulse repetition frequency of four hundred cycles per second or twenty-five hundred micro-seconds per cycle, which is adequate for a hundred mile search range.

Fig. 2 illustrates in diagrammatic, time-spacing form the twenty-five hundred micro-seconds cycle, without the figure attempting to show the wave form or the length or shape of the pulses. The first fifteen hundred microseconds of the cycle is utilized to transmit the radar pulse and get back the last echo of the pulse. This then provided a one-thousand micro-second interval in each radar cycle in which an individual airplane or airplanes can be interrogated and controlled.

The apparatus has been illustrated and will be described as controlling three airplanes, although it will be understood that more or less airplanes can be controlled. Usually no more than three airplanes are controlled inasmuch as following and controlling more than this number becomes difficult. It is also to be noted that each controlled airplane will have an auto-pilot and a course corrector and the apparatus of the present invention will supplement these only when additional control is desired or necessary.

Specifically, Fig. 2 illustrates the pulse signals transmitted to airplane No. 1 as including a pair of pulses, each about one-half micro-second long, transmitted at T equals fifteen hundred micro-seconds and T equals fifteen hundred and fifty micro-seconds. The decoding apparatus carried by airplane No. 1 will not respond to any control signals unless such control signals follow the interrogation or trigger signals time-spaced as just described. In a like manner, the interrogation signals sent to airplane No. 2 are sent at T equals fifteen hundred and T equals sixteend hundred and fifty micro-seconds. No other combination of interrogation signals will trigger the decoder apparatus carried by airplane No. 2 for control operation. Similarly, the decoder apparatus of airplane No. 3 will respond only to interrogation signals sent at T equals fifteen hundred and T equals seventeen hundred and fifty, all as illustrated in the indicated wave form.

It will be understood that associated with the coder apparatus is a hand operated control mechanism which will include positions for the selection of an interrogation signal for any one of the three controlled airplanes. Only one airplane can be interrogated at a time. Such selector buttons or mechanism is indicated diagrammatically in Fig. 1 in association with mixer Nos. 1, 2 and 3, of the Synchronizing Unit of Fig. 1, and has been indicated in the drawing by the numerals 1, 2 and 3, respectively. After a given airplane is selected to be controlled, then the control mechanism can be hand actuated to provide a "left," "right," "down" or "auxiliary" control, such additional control mechanism being indicated diagrammatically in association with mixer Nos. 1, 2, 3, and 4 in the Command Unit portion of the coder apparatus shown in Fig. 1, such additional hand operated controls being indicated respectively by the numerals 4, 5, 6 and 7. Thus, when checking on airplane No. 1, control 1 will be positioned to interrogate airplane No. 1 and trigger the decoder apparatus carried thereby. Then, should the radar scope show the plane straying to the left, "right" control 5 will be pushed to bring the airplane No. 1 back on course. It is possible to push only one of the controls 4, 5 and 6 at one time, although control 7, "auxiliary," can be operated simultaneously with any of the controls 4, 5 or 6.

It will be understood that the principles of the invention can be utilized to provide other than "left," "right," "down" and "auxiliary" control functions if desired for any particular situation. Usually the "left" and "right" controls are effected by means of a non-locking three position lever switch having a neutral center position, and the "auxiliary" command is selected by a similar switch with one position to select an "on-off" pulse signal and the other position to select the proportional signal, the magnitude of the latter being determined by a potentiometer 7 mounted in the control mechanism. The "down" command is selected by a non-locking push-button fitted with a guard to prevent accidental operation, the control switches usually actuate relays mounted within the coder apparatus in a manner that will be understood.

It is advisable to transmit a control or command signal for a period of time, such as one complete scan of the radar antenna, to insure that the airplane being controlled is illuminated by the transmitted beam, and for this reason the control relays remain closed after actuation as long as the control is closed, or if the control is pushed and released for a period of two seconds approximately. This insures that the radar antenna completes at least one scanning cycle. Of course, a control signal can be actuated for additional periods or scans of the radar antenna any desired number of times. In any event, a single scan of the radar antenna will include several hundred radar cycles each of the 2500 micro-second length, but with only perhaps a small number of the radar cycles occurring while the controlled airplane is actually illuminated by the transmitting radar antenna.

Fig. 2 also illustrates in time relation form the character of the command or control signals to each of the airplanes, namely, "left," "right," "down," "auxiliary fixed" and "auxiliary variable."

*Coder—general description*

The coder is illustrated in block diagram form in Fig. 1. Substantially all of the components of the coder, namely, the gates, the oscillators, the squarer and differentiator, the coincidence circuits, the mixers, the Eccles-Jordan circuit, and the variable gate, are individually well known and understood by the man skilled in the art, but out of an abundance of precaution, individual schematic wiring diagrams of typical circuits for the individual blocks of Fig. 1 have been illustrated in part in Figs. 6 and 7, each of these figures being appropriately identified by the title of the block. The particular circuit constants or individual circuit item values in each of Figs. 6 and 7 have not been identified for the reason that these constants will vary dependent upon the type of tube used, and the relation of the other circuits. The selection of proper constants to achieve the relationship and effects herein set forth is within the ability of the man skilled in the art.

The interrogation and control signals generated by the coder serve as an input to the modulator of the radar transmitter, identified by the numeral 8, and control of the modulator during that portion of the period between search pulses which are not used for receiving radar echoes. In the apparatus of the invention, the coder is an externally triggered unit and requires a monitor trigger pulse from the radar at the start of the radar cycle, specifically, T equals zero micro-seconds, in order to start the coder into operation. The signals from the coder determine only the time spacing between the transmitted pulses, their width and amplitude being determined by the modulator.

*Coder—interrogation pulse generator*

The apparatus of Fig. 1 is divided by a dash line into a Command Unit and a Synchronizing Unit. The Synchronizing Unit comprises the interrogation pulse generator which generates (1) the interrogating signals and (2) a timing pulse which actuates the command pulse generator. The wave forms occurring at various points of the generator chain are shown in Fig. 3.

The input to the interrogation pulse generator or Synchronizing Unit is obtained from the radar set 8 and consists of a monitor pulse occurring with the start of each radar cycle (T equals zero). The monitor trigger pulse input connections are indicated by the numeral $8^a$ and the numeral 9. The input $8^a$ is applied to the fifteen hundred micro-seconds gate $10^a$ whose output at T equals fifteen hundred micro-seconds is applied to each one of blocks 10, 11 and 12, comprising, respectively, mixer No. 1, mixer No. 2, and mixer No. 3. Also, the output of gate $10^a$ is applied to trip a three hundred micro-second gate 13 and a one hundred micro-second gate 14. The monitor trigger pulse is also applied by the connection 9 to the Eccles-Jordan circuit 15, as shown, and serves to establish the desired initial circuit condition at the start of each first radar cycle.

The three hundred micro-second gate 13 shock-excites a ten kc. oscillator 16 whose first half cycle of oscillation is negative. The oscillator output (see Fig. 3) contains three cycles and the output wave is squared and differentiated in the circuit 17 to give an output signal of alternately positive and negative pulses spaced fifty micro-seconds apart and starting with a negative pulse at T equals fifteen hundred micro-seconds. Of course, the three hundred micro-seconds gate controls the duration of the oscillator output, all as will be evident from Fig. 3.

The one hundred micro-second gate of circuit block 14 is applied to coincidence circuit No. 1, block 18, and therein selects the first positive pulse derived from the ten kc. oscillator (T equals fifteen hundred fifty micro-seconds). This pulse and the trigger pulse are fed to mixer No. 1, identified by the numeral 10, and the positive pulse from the coincidence circuit No. 1 also triggers a one hundred and fifty micro-second gate 19 which starts at T equals fifteen hundred fifty micro-seconds and ends at T equals seventeen hundred micro-seconds. The gate 19, applied to coincidence circuit No. 2, identified in the drawing by numeral 20, selects the second positive oscillator pulse (at T equals sixteen hundred fifty micro-seconds) which is fed, along with the trigger pulse, to mixer No. 2, identified by the numeral 11. The output of coincidence circuit No. 2 also starts a one hundred and fifty micro-second gate 21 which is applied to coincidence circuit No. 3, identified by the numeral 22, where the third positive oscillator pulse is selected (T equals seventeen hundred fifty micro-seconds). This third oscillator pulse and the trigger pulse are fed to mixer No. 3, identified by the numeral 12. The three mixers produce no output until the buttons or switches 1, 2, or 3 are closed to operate the control relays in the mixer circuits. By the means just described, the operation of button 1 will produce output pulses separated by fifty micro-seconds (to interrogate or trigger airplane No. 1), the operation of button 2 will produce output pulses separated by one hundred and fifty micro-seconds (to interrogate or trigger airplane No. 2), and the operation of button 3 will produce output pulses separated by two hundred and fifty micro-seconds (to interrogate or trigger airplane No. 3). Only one airplane is interrogated at a time.

In following the aforesaid description, reference to Fig. 2 and the wave forms shown therein, will be helpful.

The Eccles-Jordan circuit 15 generates a pulse which is coincident with the second of the interrogation pulses (T equals fifteen hundred fifty micro-seconds) and which serves as the timing pulse to initiate the operation of the command pulse generator.

Coder—command pulse generator

The command pulse generator, known as the Command Unit in Fig. 1, generates the command or control pulses which are timed with respect to the second of the two interrogating pulses.

To describe the operation of the Command Unit, it will be assumed that airplane No. 1 is being interrogated and therefore the input timing pulse from the Synchronizing Unit occurs at T equals fifteen hundred fifty micro-seconds. Now having reference to Figs. 1 and 3, particularly the latter, the timing pulse starts a two hundred fifty micro-second delayed gate, identified in the block wiring diagram by the numeral 23, whose trailing edge occurs at T equals eighteen hundred micro-seconds, and the output of the gate is used to trigger a four hundred micro-second gate 24 and a one hundred micro-second gate 25. The four hundred micro-second gate 24 shock-excites a ten kc. oscillator 26 whose output is squared and differentiated at 27 to produce a signal of alternately positive and negative pulses fifty micro-seconds apart and starting with a negative pulse at T equals eighteen hundred micro-seconds. This signal goes to coincidence circuit Nos. 1, 2, 3 and 4, and identified respectively, by the numerals 28, 29, 30 and 31.

The one hundred micro-second gate 25, starting at T equals eighteen hundred micro-seconds and ending at T equals nineteen hundred micro-seconds, is applied to coincidence circuit No. 1 (block diagram 28) and allows the first positive oscillator pulse to produce an output pulse at T equals eighteen hundred fifty micro-seconds which is applied to mixer No. 1, block diagram 32, and to mixer No. 3, block diagram 33. Also, the first positive oscillator pulse at T equals eighteen hundred fifty micro-seconds is applied to and triggers a one hundred and fifty micro-second gate, identified in the block diagram by the numeral 34. The one hundred and fifty micro-second gate 34 starts at T equals eighteen hundred and fifty micro-seconds and ends at T equals two thousand micro-seconds, and is applied to coincidence circuit No. 2 (block diagram 29) to allow the second positive oscillator pulse to produce an output pulse at T equals nineteen hundred fifty micro-seconds which is applied to mixer No. 1 (block diagram 32) and to mixer No. 2 (identified as block diagram number 35).

The second positive oscillator pulse producing an output pulse at nineteen hundred and fifty micro-seconds is also applied to and triggers a second one hundred and fifty micro-second gate, identified in the block diagram by numeral 36. Gate 36 starts at T equals nineteen hundred fifty micro-seconds and ends at T equals twenty one hundred micro-seconds, and is applied to coincidence circuit No. 3 (block diagram 30) to allow the third positive oscillator pulse to produce an output pulse at T equals twenty hundred and fifty micro-seconds, which is applied to mixer No. 2 (block diagram 35), and mixer No. 3 (block diagram 33), and which also triggers a one hundred and fifty micro-second gate No. 3, and identified by the numeral 37 in the block diagram. Gate No. 3 (block diagram 37) starts at T equals twenty hundred and fifty micro-seconds and ends at T equals twenty-two hundred micro-seconds and is applied to coincidence circuit No. 4 (block diagram 31) to allow the fourth positive oscillator pulse to produce an output pulse at T equals twenty-one hundred and fifty micro-seconds which is applied to mixer No. 4, identified in the block diagram by numeral 38, and which also triggers a phantastron gate 39. Each one of the gates 34, 36 and 37 has rounded corners (see Fig. 3) to prevent the initiating pulse from appearing at the output.

When the "left" control 4 is energized, the output of mixer No. 1 (identified in block diagram by the number 32), consisting of two pulses T equals eighteen hundred fifty micro-seconds and T equals nine hundred and fifty micro-seconds, goes through mixer No. 5 (block diagram 40), to the output modulator lead 41 which will impart to the radar wave the aforesaid two pulses at the indicated time. When the "right" command control 5 is energized, the output of mixer No. 2 (block diagram 35), consisting of two pulses T equals nineteen hundred and fifty micro-seconds and T equals twenty hundred and fifty micro-seconds, goes through mixer No. 5 (block diagram 40) to the modulator lead 41. In a like manner, when the "down" command control 6 is energized, the output of mixer No. 3 (block diagram 33) goes through mixer No. 5 (block diagram 40) to the modulator lead 41. The "left," "right," and "down" command relays are so connected as to prevent more than one relay being energized at one time.

When a single fixed pulse is desired for the fourth command, the variable gate 39 is inoperative and the only input to mixer No. 4 (block diagram 38) is a single pulse from coincidence circuit No. 4 (block diagram 31) occurring at T equals twenty one hundred fifty micro-seconds. When the variable control command is desired, the variable gate 39 is rendered operative by positioning potentiometer 7 and is triggered by the fixed pulse just mentioned. The variable gate 39 output is a pulse occurring between T equals twenty-one hundred fifty micro-seconds and T equals twenty-two hundred fifty micro-seconds and after amplification by the pip amplifier 42 is applied to mixer No. 4 (block diagram 38). The output of mixer No. 4 in either fixed (single pulse) or variable (double pulse) form goes through mixer No. 5 (block diagram 40) to the output modulator lead 41. This fourth command "auxiliary" may be sent simultaneously with any one of the other three commands.

Decoder—general description

The decoder, shown in block diagram form in Fig. 4, is associated with the receiver in the remotely controlled airplane and includes an interrogation pulse analyzer or Synchronizing Unit and a command pulse analyzer or Command Unit. In Fig. 4, a dash line through the block diagram separates the Synchronizing Unit from the Command Unit. The decoder equipment analyzes the receiver signal output and if the interrogating or synchronizing signals are correct then extracts the pulses pertaining to the command intelligence which was transmitted over each cycle of the radar wave between T equals fifteen hundred and T equals twenty-five hundred micro-seconds, and provides signal output of each command function for control of the auto pilot and course corrector.

The output of the airplane receiver is fed to the decoder which not only actuates the proper control channels as aforesaid, but which also activates a beacon transmitter carried by the airplane so as to permit beacon response to the received radar search pulse. The use of a beacon transmitter and the beacon response make it much easier to follow the airplane at a considerable distance than if the radar echo alone were relied on. It will be understood that the beacon transmitter operated by the airplane will be actuated within the limits between T equals zero and T equals fifteen hundred micro-seconds of each radar wave cycle.

The first cycle that will be accepted in one search pulse or radar cycle, is the interrogation signal consisting of two pulses with a time spacing predetermined for a given remotely controlled airplane and the decoding apparatus associated with the radio receiver thereof. When the signal is received and accepted, the decoder command signal analyzer, or Command Unit, is energized and the subsequent control signal pulses are analyzed. This sequence must be completed in one search pulse or radar cycle, i.e., T equals zero to T equals twenty-five hundred micro-seconds.

The outputs of the decoder for the "left," "right," and "down" functions are in the form of three separate D.C. voltages which are utilized by a course corrector system in conjunction with the airplane's automatic pilot. The output of the fourth function "auxiliary" may be either a single narrow pulse or a wide pulse (gate) whose width varies according to the proportion of the control desired for the controlled aircraft, as explained in part in conjunction with the Command Unit of the coder apparatus.

*Decoder—interrogation pulse analyzer*

The interrogation pulse analyzer, that is, the Synchronizing Unit in Fig. 4, analyzes the receiver output of the airplane and selects the proper interrogation signal if it is present. When such an interrogating signal is received and accepted by the Synchronizing Unit, this unit provides a pulse to the Command Unit to initiate its operation.

The signal output of the airplane receiver 43, consisting of positive pulses, is passed to the Synchronizing Unit of the decoder, where it is applied to a bias amplifier 44 whose output will contain the peaks of the signal pulses and very little of the receiver noise. The signal from the amplifier 44 is applied to a variable or selector gate circuit 45 which may be triggered by any one of the incoming pulses. However, it will be apparent from a study of the wave forms (see Fig. 5) that the Synchronizing Unit of the decoder will only produce an output to the Command Unit when the variable gate 45 starts with the first of the synchronizing pulses, marked Sync-A in Fig. 5.

The variable gate 45 is controlled by switch mechanism 46, the switch mechanism being adapted to be set at either station Nos. 1, 2, or 3, it being understood that in airplane No. 1 the switch mechanism 46 will be set at station No. 1, in airplane No. 2 at station No. 2, and in airplane No. 3 at station No. 3, to thereby set the gates 45 on the decoding apparatus of the several airplanes so that each gate will be different from the other to insure response or acceptance of interrogation signals only when intended for the specific airplane.

From the variable gate 45 the received pulses pass to a biased amplifier 47 and thence to a blocking oscillator 48. For airplane No. 1, the blocking oscillator will produce an output pulse on the first input pulse occurring at T equals fifteen hundred twenty-five micro-seconds, for airplane No. 2, an output pulse occurring at T equals sixteen hundred and twenty-five micro-seconds, and for airplane No. 3, an output pulse occurring at T equals seventeen hundred and twenty-five micro-seconds.

To describe the operation further, it is assumed at this point that the variable gate 45 is set for airplane No. 1, and thus the blocking oscillator produces an output pulse at fifteen hundred twenty-five micro-seconds. This pulse triggers a fifty micro-second gate 49 which is applied to coincidence circuit 50 and which will allow the coincidence circuit to fire if there is a pulse on the incoming signal which lies between T equals fifteen hundred twenty-five micro-seconds and T equals fifteen hundred and seventy-five micro-seconds, as applied thereto from the biased amplifier 44. If airplane No. 1 is being interrogated the "Sync-B" pulse (see Fig. 5) occurring at T equals fifteen hundred fifty micro-seconds coincides with the gate and will produce an output pulse fifteen hundred and fifty micro-seconds which is the timing pulse for the command unit.

*Decoder—command pulse analyzer*

The command pulse analyzer, or Command Unit in Fig. 4, is placed in operation by the timing pulse derived from the Synchronizing Unit as just described, with the Command Unit then analyzing the command signal pulses. Such action is completed during one search pulse or radar cycle (T equals zero to T equals twenty-five hundred micro-seconds). The wave forms are shown in Fig. 5.

To facilitate description of the operation, it is assumed that the synchronizing times of airplane No. 1 are set up in the interrogation pulse analyzer. The timing pulse from the Synchronizing Unit, at T equals fifteen hundred fifty micro-seconds under this condition, triggers a two hundred and fifty micro-second gate circuit 51 used as a fixed delay. The trailing edge of this gate (at T equals eighteen hundred micro-seconds), triggers a four hundred micro-second gate 52 which shock-excites a twenty kc. oscillator 53 whose first half cycle of oscillation is negative.

The oscillator output is squared and differentiated at 54, and is applied to a biased amplifier 55 to clip off the negative pulses. The amplifier output is a series of eight positive pulses, fifty micro-seconds apart and starting at T equals eighteen hundred and twenty-five micro-seconds, and the output of the cathode follower 55 is passed to seven Eccles-Jordan circuits, indicated respectively by the numerals 56 to 62. The output of Eccles-Jordan circuit 57 extends to a cathode follower 63, the output of Eccles-Jordan circuit 59 extends to a cathode follower 64, the output of Eccles-Jordan circuit 61 extends to a cathode follower 65, and the ouput of Eccles-Jordan circuit 62 extends to a one hundred twenty-five micro-second gate 66. Cathode follower 63 connects to coincidence circuit 67, cathode follower 64 connects to coincidence circuit 68, cathode follower 65 connects to coincidence circuit 69, and gate 66 connects to coincidence circuit 70. Coincidence circuits 67, 68, 69 and 70 are all connected to the biased amplifier 44.

The output pulse of coincidence circuit No. 1 (block diagram 67) triggers a two hundred and fifty micro-second gate 71 which starts at T equals eighteen hundred and fifty micro-seconds and ends at T equals twenty-one hundred micro-seconds. This gate is applied to coincidence circuit Nos. 5 and 6, identified in the block diagram by numbers 72 and 73, and will allow passage of the pulses from coincidence circuits Nos. 2 and 3. The output of coincidence circuit No. 5 will then be a single pulse at T equals nineteen hundred and fifty micro-seconds, and occurring only when the "left" command is produced by the coder. The output of coincidence circuit No. 6 will be a single pulse at T equals twenty hundred and fifty micro-seconds, and occurring only when the "down" command is produced by the decoder. The output pulse of coincidence circuit No. 2 also triggers a one hundred and fifty micro-second gate (block diagram 74) which starts at T equals nineteen hundred and fifty micro-seconds and ends at T equals twenty-one hundred micro-seconds. This gate is applied to coincidence circuit No. 7 (block diagram 75) and will allow passage of the pulse from coincidence circuit No. 3. The output of coincidence circuit No. 7 will then be a single pulse at T equals twenty hundred and fifty microseconds, and occurring only when the "right" command is produced by the "coder." The "right," "left," and "down" pulses are fed to the signal control circuits, indicated respectively by the numerals 76, 77, and 78, to produce D.C. control voltages for the course corrector of the auto pilot.

Having reference to Fig. 6, the "left," and "right" signal control circuits are actuated by the signals described above which trigger the thyratrons T¹ and T² shown. Relay K¹, energized by D.C. voltage from the course corrector, is normally closed providing plate voltage for both T¹ and T² through relays K² and K³. If T¹ fires, K² is energized closing two sets of contacts. One set of contacts applied plus twenty-eight volts D.C. to a line to the course corrector for initiating the course correction. When this voltage is received by the course corrector it interrupts the D.C. voltage to K¹ and allows its contacts to remain open during a correcting cycle preventing T¹ and T² from firing during this time. The second set of contacts on K² grounds the plate of T¹ to turn it off and at the same time hold K² energized until the K¹ contact opens and removes the source of voltage for K². After completion of the course-correction cycle, K¹ contacts are again closed and the circuit is ready to accept another signal. Operation of T² and K³ is identical to the above.

The "auxiliary" control is obtained in the following manner: The output of the one hundred twenty-five micro-second gate 66 is applied to coincidence circuit No. 4 (block diagram 70) and allows passage of the No. 4ª command pulse (see Fig. 5) at T equals twenty-one hundred fifty micro-seconds, and also the No. 4ᵇ command pulse which may occur between T equals twenty-one hundred fifty micro-seconds and T equals twenty-two hundred and fifty micro-seconds. If the system is pre-set for "fixed" control by a switch 79, the output of coincidence circuit No. 4 will be a single pulse at T equals twenty-one hundred fifty micro-seconds which goes through a cathode follower 80 to an output jack 81. If the "variable" control is used, the No. 4ª and No. 4ᵇ output pulses of coincidence circuit No. 4 are applied to the Eccles-Jordan circuit 82 whose output will be a gate starting with the No. 4ª pulse and ending with No. 4ᵇ pulse. This gate comes to an output jack 83.

The trailing edge of the one hundred twenty-five microsecond gate 66 is used to trigger a four hundred microsecond gate 84. This gate is applied to the radar coincidence circuit 85 as is the biased amplifier 44, to allow the radar-search pulse at T equals zero micro-seconds to trigger the beacon transmitter 86. This trigger pulse at T equals zero micro-seconds is also applied to the Eccles-Jordan circuit 82 to insure proper operation of this circuit during the following command period of the radar cycle.

From the foregoing, it will be recognized that the various objects of the invention have been achieved by the provision of interrogating and command apparatus in association with a radar-transmitter, together with interrogation responsive and command responsive apparatus in conjunction with one or more airplanes or other bodies being remotely controlled, whereby the radar will not only serve to follow the remotely controlled airplanes or other bodies, but will also function to control them. In addition, the radar may simultaneously function to locate target, landing, or other items or areas. Three or more airplanes or other bodies can be followed and controlled, although it is to be understood that the apparatus may be utilized in conjunction with the control of a single airplane or other body. If this be the case, part or all of the interrogation or synchronizing apparatus of the coder and decoder may be eliminated. The apparatus has been illustrated and described as including three "on"-"off" types of command, plus a fourth fixed or variable control. The exact number and the particular type of commands can obviously be altered to best meet the required operating conditions for a particular or desired remote control.

While in accord with the patent statutes the invention has been particularly illustrated and described with respect to one best known embodiment thereof, it is to be particularly understood that the invention is not limited thereto or thereby, but that the scope of the invention is defined in the appended claims.

The terms "radar apparatus, radar transmitter, or radar" as employed in the specification and claims are intended to define what might be termed a conventional radar system including an ultra high frequency transmitter operating into a narrow beam antenna which is swept in scanning movement of periodic repeated character, together with a receiver for receiving the radar echoes or reflected signals. The transmitter operates to repeat its fractional micro second radar search pulse at intervals of several thousand micro seconds so that some four hundred search pulse cycles per second are achieved.

What is claimed is:

1. Remote control apparatus comprising a radar transmitter and echo receiver, a coder including a synchronizing unit for modulating the transmitted radar wave with any selected set of a plurality of sets of differently time-separated pulses, a decoder carried by the body being controlled, and including a synchronizing unit responding to only one selected set of time-separated pulses, a command unit in the coder for modulating the transmitted radar wave with any selected set of a plurality of sets of differently time-separated pulses, a command unit in the decoder responding to any selected command accepted by the synchronizing unit of the decoder for establishing electric current flow to operate controls on the body, and a beacon transmitter triggered by the decoder for transmitting a beacon signal to the radar echo receiver.

2. Remote control apparatus comprising a radar transmitter and echo receiver, a coder including a synchronizing unit for modulating the transmitted radar wave with any selected set of a plurality of sets of differently time-separated pulses, a decoder carried by the body being controlled and including a synchronizing unit responding to only one selected set of time-separated pulses, a command unit in the coder for modulating the transmitted radar wave with any selected set of a plurality of sets of differently time-separated pulses, and a command unit in the decoder responding to any selected command accepted by the synchronizing unit of the decoder for establishing electric current flow to operate controls on the body.

3. In combination in apparatus for following and controlling a body, a radar apparatus having a search pulse cycle approximately twice as long as the time required to return the last desired echo signal, means for modulating the radar wave at a specific time after the start of the search pulse cycle and after the return of the last desired echo signal to provide a first set of a plurality of pulses separated by coded time intervals, switch means for changing the coded selection of the specific time of operation of the radar wave modulating means, means carried by the body being controlled for picking up the pulses, selector gate means for accepting the interrogating pulses if properly coded as to time, means triggered by the acceptance of the pulses for establishing command channels and for supplying control currents to the body, means modulating the radar wave to produce a second set of pulses separated by coded time intervals through the command channels to control the operation of the control currents, and means triggered by the acceptance of the first set of pulses for transmitting a beacon signal to the radar echo receiver.

4. In combination in apparatus for following and controlling a body, a radar apparatus having a search pulse cycle approximately twice as long as the time required to return the last desired echo signal, means including selective switch mechanism for modulating the radar wave at a selected time after the start of the search pulse cycle and after the return of the last desired echo signal to provide a set of pulses of a selected time separation, means carried by the body being controlled for picking up the time coded pulses, selector gate means for accepting or rejecting the interrogating pulses, and means triggered by the acceptance of the pulses for establishing control channels in the body, means for modulating the radar wave at a selected time interval after the first set of pulses to provide a second set of pulses of selected time separation for controlling the supply of control currents to the body through the control channels of the body pulses.

5. In combination in apparatus for following a body, a radar apparatus, means for modulating the radar wave at a specific but selectively variable time after the start of the search pulse cycle and after the return of the last desired echo signal to provide time separated pulses of time coded interrogating character, means carried by the body being controlled for picking up the interrogating pulses, a time coded selector gate circuit for accepting or rejecting the interrogating pulses, and means triggered by the acceptance of the interrogating pulses for transmitting a beacon signal to the radar echo receiver.

6. In combination in apparatus for following and controlling a plurality of bodies, a radar apparatus having a search pulse cycle approximately twice as long as the time required to return the last desired echo signal, means for modulating the radar wave at a selected time after the start of the search pulse cycle and after the return of the last desired echo signal, means to select a different time of operation of the modulating means for each body and to provide time separated interrogating pulses, means carried by each body being controlled for picking up the interrogating pulses, a time coded selector gate circuit for accepting or rejecting the interrogating pulses, and means triggered by the acceptance of the interrogating pulses for establishing command circuits and for supplying control currents to the body.

References Cited in the file of this patent

UNITED STATES PATENTS

| | | |
|---|---|---|
| 2,252,083 | Luck | Aug. 12, 1941 |
| 2,371,415 | Tolson | Mar. 13, 1945 |
| 2,388,748 | Kopetzky | Nov. 13, 1945 |
| 2,399,954 | Thomson | May 7, 1946 |
| 2,407,199 | Wolff | Sept. 3, 1946 |
| 2,420,693 | White | May 20, 1947 |
| 2,421,017 | Deloraine | May 27, 1947 |
| 2,436,846 | Williams | Mar. 2, 1948 |
| 2,444,452 | Labin | July 6, 1948 |
| 2,453,970 | Charrier | Nov. 16, 1948 |
| 2,459,482 | Bond | Jan. 18, 1949 |
| 2,480,068 | Wolff | Aug. 23, 1949 |
| 2,513,490 | Jones | July 4, 1950 |
| 2,531,412 | Deloraine | Nov. 28, 1950 |
| 2,537,102 | Stokes | Jan. 9, 1951 |
| 2,594,305 | Haller | Apr. 29, 1952 |